Patented Nov. 30, 1943

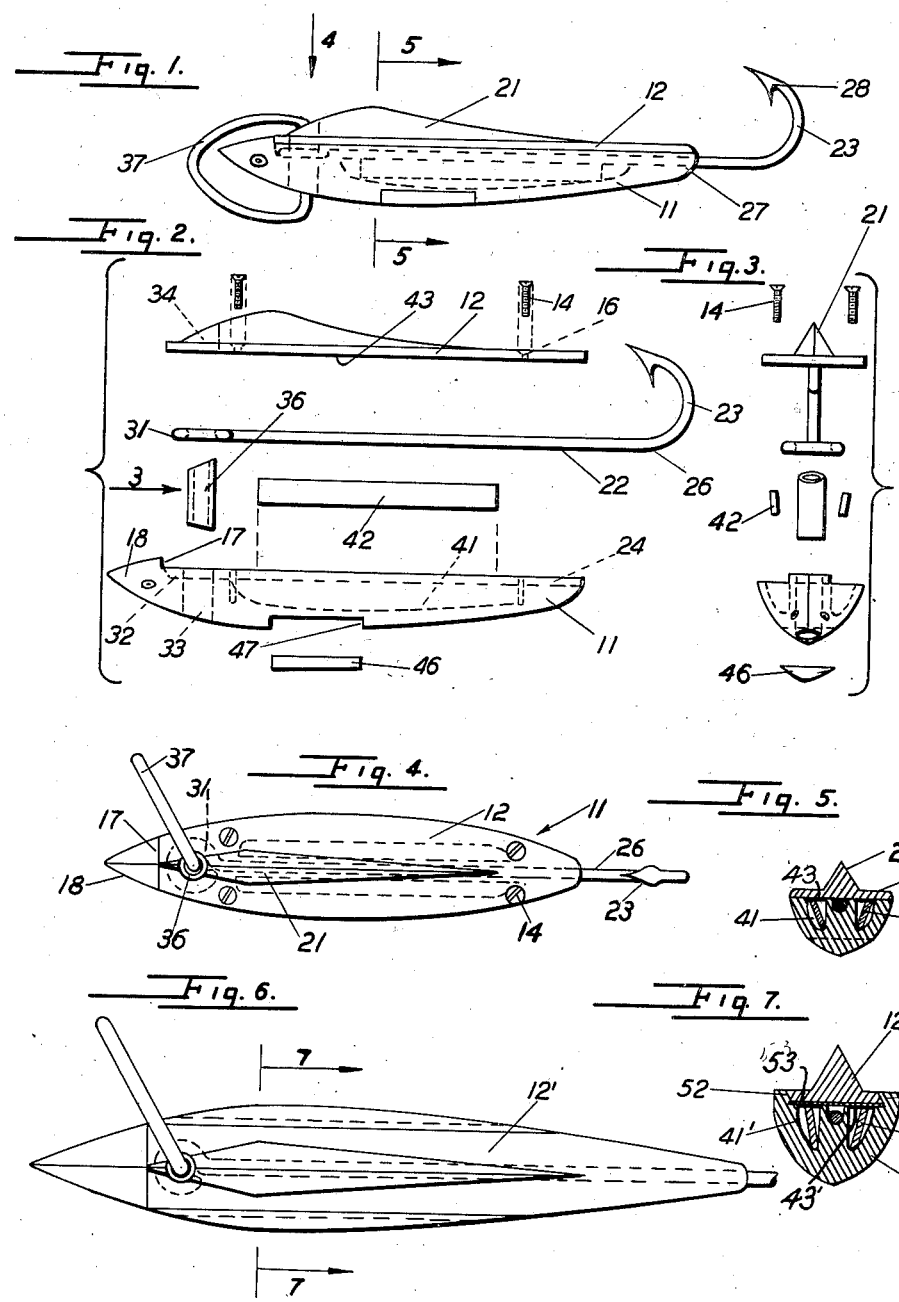

2,335,322

UNITED STATES PATENT OFFICE 2,335,322

LUMINOUS FISH LURE

James V. Taylor, Los Angeles, Calif.

Application April 15, 1941, Serial No. 388,594

5 Claims. (Cl. 43—44)

This invention relates to the art of fishing, and more particularly to a luminous artificial bait.

An object of the present invention is the provision of an artificial fishing bait, or lure, of improved, efficient, and highly attractive design, the body of which is composed of translucent and preferably transparent material, so that light emanating from a luminous member within the body will be visible while the lure is in use, thus increasing the visibility of the device to such an extent that it proves much more efficacious as a fishing bait than one of more conventional design.

A further object of my invention is the provision of a fishing lure having a source of luminosity incorporated therein as described, wherein the luminous element is in the form of a separate, replaceable cartridge removably disposed within the translucent body of the bait, thereby making possible the ready replacement of the luminous element when it has been in service so long as to impair its efficiency.

Another object is the provision of means for sealing the lure against penetration of moisture to the luminous element, thereby permitting use of the bait in either fresh or salt water without danger of impairing the efficiency of the luminous element by contact of water therewith.

A further object in this connection is the provision of a sealing closure which is readily removable, which detail is another contributing factor toward facilitating replacement of an aged or otherwise damaged luminous member.

Another object of the present invention is to provide a fishing bait of the character described, wherein the shank of the hook as well as both the body and the removable cover plate therefor, are directly engaged upon a bail, so that even though the bait might be taken by a large and powerful fish and be given such violent abuse thereby that its several elements might become separated, neither the hook nor either part of the body can become disengaged from the line and thus lost.

The invention possesses other objects and valuable features, some of which, with those enumerated, will be set forth in the following description of the preferred embodiments of my invention illustrated in the drawing accompanying and forming part of the specification. It is to be understood that I do not limit myself to the showing made by the said drawing and description as I may adopt variations of the preferred forms within the scope of my invention as set forth in the claims.

Referring to the drawing:

Figure 1 is a view in side elevation of an illuminated fishing bait embodying the principles of the present invention.

Figure 2 is an exploded side elevational view of the fishing bait of Figure 1, the parts thereof being shown separated.

Figure 3 is an exploded view in front elevation, the direction of view being indicated by the arrow 3 of Figure 2.

Figure 4 is a top plan view, direction of view being indicated by the arrow 4 of Figure 1.

Figure 5 is a transverse, sectional view, the plane of section being indicated by the line 5—5 of Figure 1 and the direction of view by the arrows.

Figure 6 is a view similar to Figure 4, but showing a modified form of construction. Portions of the figure are broken away to reduce its length.

Figure 7 is a transverse vertical sectional view, the plane of section being indicated by the line 7—7 of Figure 6 and the direction of view by the arrows.

Referring first to that embodiment of my invention illustrated in Figures 1 to 5 inclusive, my illuminated, artificial fishing bait comprises a body portion 11 and a separate fitted cover plate 12 co-operatively formed to present a streamlined construction resembling a small fish in general configuration. These two members 11 and 12 lend themselves readily for construction of one of the modern cellulose plastic materials; and whereas the cover plate 12 is preferably opaque and of some suitable bright color so as to enhance the visibility of the device, the body portion 11 is transparent, or at least translucent. The cover plate 12 is preferably releasably secured to the top surface of the body portion 11 as by a plurality of small machine screws 14 countersunk within, and extending through clearance holes 16 in the cover plate 12 to be threadedly engaged within the body portion 11; and in order to enhance the streamlined effect of these two co-operating members, I prefer to provide a shoulder 17 on the upper surface of the body 11 adjacent its forward end 18, substantially corresponding in height to the thickness of the forward end of the cover plate 12 so as to present a smooth surface at this line of juncture of the body and cover plate. Inasmuch as it is desirable to establish a moisture proof seal between the body 11 and its cover plate 12, I prefer also to employ a suitable sealing or bonding material to aid in uniting these two members.

The cover plate 12 is preferably provided with an upwardly projecting flange 21 extending longitudinally throughout the major portion of the length of the cover plate 12, the function of this flange or fin 21 being to guide the bait in a more nearly steady motion as it is being dragged through the water.

The flange or fin 21, as is clearly illustrated in Figures 1, 2, 4, and 5, is of streamlined design being tapered to both its fore and after ends as well as toward its top, and since it projects upwardly from the substantially flat surface of the cover plate 12 it is quite effective in guiding the bait as it moves through the water. Were the bait to be constructed without the fin 21 it would twist, i. e., rotate over and over as it is being dragged through the water.

The shank 22 of a hook 23 is imbedded within the upper surface of the body 11, a suitable groove 24 being provided therein for the reception of the shank 22. The after end 26 of the shank 22 extends beyond the after end 27 of the body 11 and cover 12 so as to dispose the hook 23 and its barb 28, both of which are preferably of conventional design, a suitable distance aft of the main portion of the bait. An eye 31 is formed on the forward end of the shank 22, a suitable recess 32 also being provided in the upper surface of the body 11 to receive the eye 31. The body 11 and cover 12 are provided with holes 33 and 34 respectively in registry with the eye 31 so that when the cover plate 12 is in position on the body 11 a bushing 36 can be thrust through these three aligned openings, permitting a bail 37 extending through the tube 36 to so efficaciously interconnect the body 11, cover 12, and hook 23 that even were these portions to become separated while in use they could not become disengaged from the bail 37 and hence are effectively insured against loss.

The bail 37 also cooperates with the guiding fin 21 in causing the bait to have a peculiar motion as it is dragged through the water. It should be observed that the point of attachment on the bail 37 is materially aft of the extreme forward point of the bait with the result that the sufficient length of the bait projects forward of the point of attachment of the line thereto to have a very definite effect upon the type of motion of the bait. Actual use of the bait has demonstrated that its motion is very effective in attracting the attention of fish. Whereas this motion is relatively steady, i. e., uniform it is not a straight line motion but rather a series of straight lines. The lure will dart to one side for a few feet and then, presumably because of the angularity which has then developed between the longitudinal axis of the lure and the line, will suddenly swerve back and dart to the other side repeating this process in a sustained series of zigzag darting motions. It will be appreciated that such motion closely simulates the actual swimming movement of certain types of small fish; and this is probably one of the reasons why the lure of my invention has proven so effective in carrying out the function for which it was designed.

Preferably a plurality of elongated cavities 41 are formed in the upper surface of the body 11 extending longitudinally thereof, there preferably being two such cavities, one upon each side of the longitudinal center line thereof. Each of these cavities is adapted to receive a cartridge 42 which in its most convenient form is composed of a strip of cardboard or similar material coated or otherwise treated with suitable luminous material such as phosphorescent paint capable of making it emit a definite perceptible glow of sufficient strength to shine through the translucent body 11 and make it highly visible in the dark or in semi-dark locations, such as water of the ocean at a few fathoms depth. The catridges 42 preferably lie loosely within their respective cavities 41 so as to permit their ready removal so that whenever the light-giving qualities of one or more of the cartridges becomes impaired by age or otherwise it may readily and inexpensively be replaced.

In order to enhance the apparent luminosity of my artificial bait and thereby render it more efficient in attracting fish, especially when employed at night, I prefer to provide a coating of reflective material indicated more or less diagrammatically at 43, on the under side of the cover plate 12. Inasmuch as this cover plate is preferably of opaque material, there is no need of permitting it to absorb that portion of the light from the luminous cartridges 42 which is directed upward—instead, by providing a reflective coating 43 on the under surface of the cover plate 12, that portion of the light that would be absorbed by the cover plate is reflected downwards through the translucent body 11, thus adding to the amount of light directed downwards from the cartridges directly through the translucent body.

I have found that by affixing a small mirror 46 to the under surface of the body 11, the attractiveness of the bait for most types of fish is still further enhanced. In order to preserve the streamlined design of the lure, I prefer that the mirror 46 be embedded within a suitable cavity or recess 47 so proportioned that the mirror 46 is adapted to fit nicely therein.

It should be observed that the cartridges 42 are relatively thin flat strips and that the cavities 41 within which they are disposed are so shaped in cross-section that the cartridges 42 assume positions sloping outwards and upwards (see Figure 5), the purpose being to present a flat side of each cartridge exposed upwards and downwards to each side of the bait so that no matter where a fish may be below the plate, the maximum area of luminous member will be exposed to the fish.

Whereas the luminated fishing lure of the present invention is most effective in attracting fish when used at night, so effective is the light emanating from the luminous cartridges 42 in making the bait highly visible when submerged in water that even when employed during daylight hours, I have been enabled to take highly game and wary fish, such as baracuda and tuna, when all other forms of bait have proved utterly ineffective. The luminosity of the bait as it is being dragged through the water seems to attract the attention of the game fish to such an extent as to overcome their natural wariness, and caused them to strike under circumstances when more conventional lures were employed without result.

Figures 6 and 7 show a slightly modified form of artificial bait of the present invention wherein the cover plate 12' is affixed to the body 11' by being slid longitudinally into a channel 51 formed in the upper surface of the body 11'. The side walls 52 of the channel 51 slope upwards and inwards at its upper face, the top plate 12' is narrower than at its lower face (see Figure 7) and fits within the channel 51, so that it can be removed therefrom only by being slid aft with respect to the body 11'. In this modification also suitable moisture proof bonding material is preferably employed to prevent penetration of moisture to the luminous cartridges 42' which are disposed within cavities 41' in the body 11' under the cover plate 12'.

Another detail wherein this modification differs from that previously described is that instead of being applied directly to the under surface of the cover plate 12', the reflective material is carried by a separate plate 53 which is inserted in the body 11' before the cover plate 12' is placed therein. The reflective material 43' either may be applied to the under surface of the plate 53 in the form of a coating of reflective material applied thereto or the plate 53 may be composed of suitable metal, such as stainless steel, and its under surface highly polished so as to avoid the necessity of applying a separate coating.

I claim:

1. A fish lure of the character described, comprising a body of translucent material, a hook carried thereby, means for attaching said lure to a line, said body having a cavity therein, a cartridge disposed within said cavity, luminous material carried by said cartridge, a cover plate of opaque material for said body sealing said cavity against penetration of moisture thereinto, and reflective material on the inner face of said cover plate for reflecting light from said luminous material back through said translucent material.

2. A fish lure of the character described, comprising an elongated, streamlined body of translucent, waterproof material having a longitudinally extending cavity therein upon each side of its center line, a cover plate fitted to said body and sealing said cavities against penetration of moisture thereinto, a cartridge disposed within each of said cavities, luminous material carried by each of said cartridges, a shank embedded within and extending longitudinally of said body, a hook carried by said shank, an eye on the forward end of said shank, said body and cover having holes therein in alignment with said eye, and a bail extending through said eye and said holes.

3. A fish lure of the character described, comprising an elongated, streamlined body of translucent, waterproof material having a longitudinally extending cavity therein upon each side of its center line, a cover plate fitted to said body and sealing said cavities against penetration of moisture thereinto, a cartridge disposed within each of said cavities, luminous material carried by each of said cartridges, a shank embedded within and extending longitudinally of said body, a hook carried by said shank, an eye on the forward end of said shank, said body and cover having holes therein in alignment with said eye, a bushing fitted to said eye and said holes to anchor said cover plate and said shank to said body, and a bail extending through said bushing.

4. A fish lure of the character described, comprising a body of translucent material, said body being convex on its under side and substantially flat on its upper side, and an upstanding flange on said upper side tapering toward its fore and after ends and toward its top, a hook carried by said body, means for attaching a line to said lure at a point spaced aft from the forward end thereof, and a replaceable luminous cartridge removably disposed within said body.

5. A fish lure of the character described, comprising a body of translucent material, a hook carried thereby, means for attaching said lure to a line, said body having a cavity therein, a cartridge disposed within said cavity, luminous material carried by said cartridge, a cover plate for said body, and means for reflecting light back toward said cartridge from the inner face of said cover.

JAMES V. TAYLOR.